Patented Dec. 26, 1933

1,941,146

UNITED STATES PATENT OFFICE

1,941,146

VULCANIZATION OF RUBBER

Marion W. Harman, Nitro, W. Va., assignor to The Rubber Service Laboratories Company, Akron, Ohio, a corporation of Ohio No Drawing. Application March 9, 1932
Serial No. 597,791

25 Claims. (Cl. 18—53)

The present invention relates to the vulcanization of rubber. More particularly the present invention relates to the vulcanization of rubber by an improved process wherein the products obtained by the reaction between a ketone amine and a mercaptoaryl thiazole are employed as rubber vulcanization accelerators.

One of the preferred materials, for example, the reaction product of substantially equi-molecular proportions of diacetone amine and mercaptobenzothiazole was prepared in the following manner.

Substantially 0.2 mols of diacetone amine was dissolved in a small quantity of an organic solvent, for example ether and a small excess over an equivalent quantity of mercaptobenzothiazole added thereto at room temperature at which temperature the reaction was allowed to proceed. After the reaction was completed, any unreacted mercaptobenzothiazole was separated from the reaction product, preferably by filtration therefrom. The ethereal filtrate was evaporated and the resinous product thereby obtained comprising a soft resin was incorporated in a rubber stock comprising

| | Parts |
|---|---|
| Pale crepe rubber | 100 |
| Zinc oxide | 5 |
| Sulfur | 3 |
| The reaction product of substantially equimolecular proportions of diacetone amine and mercaptobenzothiazole | 1 |

The rubber stock so obtained on testing was found after vulcanization to possess the following tensile and modulus characteristics.

Table I

| Cure | | Modulus of elasticity in lbs/in² at elongations of— | | | Tensile at break in lbs/in² | Ultimate elongation percent |
|---|---|---|---|---|---|---|
| Time minutes | Lbs. steam pressure | 300% | 500% | 700% | | |
| 10 | 40 | 220 | 818 | 2980 | 3630 | 745 |
| 20 | 40 | 258 | 955 | | 3045 | 685 |

The above tensile data show that the preferred class of accelerators possess desirable properties in that the optimum cure is reached in a short time. The preferred class of accelerators may be employed in conjunction with a basic organic nitrogen containing activating accelerator thus forming a mixed accelerator therewith. Thus a rubber stock was compounded comprising

| | Parts |
|---|---|
| Pale crepe rubber | 100 |
| Zinc oxide | 5 |
| Sulfur | 3 |
| Diphenyl guanidine | 0.6 |
| The reaction product of substantially equimolecular proportions of diacetone amine and mercaptobenzothiazole | 0.4 |

The rubber stock thus compounded was vulcanized and the cured rubber product found to possess the following tensile and modulus characteristics.

Table II

| Cure | | Modulus of elasticity in lbs/in² at elongations of— | | | Tensile at break in lbs/in² | Ultimate elongation percent |
|---|---|---|---|---|---|---|
| Time minutes | Lbs. steam pressure | 300% | 500% | 700% | | |
| 10 | 40 | 291 | 1068 | 3895 | 4020 | 710 |
| 20 | 40 | 393 | 1665 | | 4080 | 660 |
| 30 | 40 | 373 | 1635 | | 4510 | 680 |

A comparison of the data contained in Tables I and II shows that the preferred accelerators exhibit improved accelerating properties when employed in conjunction with a basic organic nitrogen containing activating accelerator for example diphenyl guanidine.

The reaction product of diacetone amine and mercaptobenzothiazole may also be prepared by heating substantially one molecular proportion of mercaptobenzothiazole with a slight excess over one molecular proportion of diacetone amine on a water bath until solution is complete.

The reaction product of substantially equimolecular proportions of diacetone amine and mercaptobenzothiazole has also been employed in a tread stock in conjunction with a basic organic nitrogen containing activating accelerator, for example diphenyl guanidine, and found to function here also as an excellent accelerator. A rubber stock was compounded comprising

| | Parts |
|---|---|
| Smoked sheet rubber | 100 |
| Carbon black | 40 |
| Zinc oxide | 10 |
| Stearic acid | 1 |
| A blended mineral oil and rosin | 2 |
| Sulfur | 3 |
| The reaction product of diacetone amine and mercaptobenzothiazole | 0.48 |
| Diphenyl guanidine | 0.72 |

The rubber product so compounded after vulcanizing and testing gave the following results:

Table III

| Cure | | Modulus of elasticity in lbs/in² at elongations of— | | Tensile at break in lbs/in² | Ultimate elongation percent |
|---|---|---|---|---|---|
| Time minutes | Lbs. steam pressure | 300% | 500% | | |
| 60 | 10 | 1303 | 3005 | 4400 | 670 |
| 120 | 10 | 1505 | 3240 | 4605 | 640 |
| 45 | 20 | 1603 | 3445 | 4800 | 640 |
| 60 | 20 | 1775 | 3830 | 4765 | 600 |
| 90 | 20 | 2000 | 4055 | 4635 | 575 |

A further example of the preferred class of accelerators comprises the reaction product of vinyl diacetone amine and mercaptobenzothiazole. Thus substantially equi-molecular proportions of vinyl diacetone amine and mercaptobenzothiazole were heated for substantially three hours at a maximum temperature of 180° C. The product thus obtained comprising a dark resin was incorporated in the usual manner in a rubber stock comprising

| | Parts |
|---|---|
| Pale crepe rubber | 100 |
| Zinc oxide | 5 |
| Sulfur | 3 |
| Stearic acid | 1 |
| The reaction product of substantially equi-molecular proportions of vinyl diacetone amine and mercaptobenzothiazole | 1 |

The rubber product so obtained was cured and tested. The following are the test data obtained.

Table IV

| Cure | | Modulus of elasticity in lbs/in² at elongations of— | | | Tensile at break in lbs/in² | Ultimate elongation percent |
|---|---|---|---|---|---|---|
| Time minutes | Lbs. steam pressure | 300% | 500% | 700% | | |
| 45 | 30 | 358 | 988 | 3735 | 4125 | 720 |

The data given in Table IV show that the reaction product of vinyl diacetone amine and mercaptobenzothiazole is a strong accelerator. Said reaction product has been employed in conjunction with a basic organic nitrogen containing accelerator. A stock was compounded comprising

| | Parts |
|---|---|
| Pale crepe rubber | 100 |
| Zinc oxide | 5 |
| Sulfur | 3 |
| Stearic acid | 1 |
| Diphenyl guanidine | 0.2 |
| The reaction product of vinyl diacetone amine and mercaptobenzothiazole prepared as described | 0.8 |

The stock so compounded was cured and tested with the results given in Table V.

Table V

| Cure | | Modulus of elasticity in lbs/in² at elongations of— | | | Tensile at break in lbs/in² | Ultimate elongation percent |
|---|---|---|---|---|---|---|
| Time minutes | Lbs. steam pressure | 300% | 500% | 700% | | |
| 45 | 30 | 421 | 1330 | 4560 | 4560 | 700 |

A comparison of the data set forth in Tables IV and V show that while the reaction product of vinyl diacetone amine and mercaptobenzothiazole alone has very desirable accelerating properties, its accelerating properties are increased by employing it in conjunction with a basic organic nitrogen containing activating accelerator.

Another of the preferred class of compounds comprises the reaction product of diphenyl amine and acetone further reacted with mercaptobenzothiazole. One method whereby said product has been prepared follows.

Substantially one molecular proportion of diphenyl amine was heated with an excess over an equi-molecular proportion of acetone for substantially 22 hours in an autoclave at a temperature of 200–210° C. in the presence of a catalyst or condensing agent, for example iodine. An oil was obtained which distilled at 150–190° C. at 5 mm. pressure. Said product is believed to be the reaction product of substantially two molecular proportions of diphenyl amine and substantially one molecular proportion of acetone. Substantially equi-molecular proportions of the product described above and mercaptobenzothiazole were heated at a temperature of substantially 170–180° C. for three hours. A dark resin was obtained which product was compounded in a rubber stock comprising

| | Parts |
|---|---|
| Pale crepe rubber | 100 |
| Zinc oxide | 5 |
| Sulfur | 3 |
| Stearic acid | 1 |
| The reaction product of substantially equi-molecular proportions of the reaction product of diphenyl amine and acetone as one reactant and mercaptobenzothiazole as the other reactant | 1 |

The stock so compounded was cured and tested and the test data obtained which is given in Table VI.

Table VI

| Cure | | Modulus of elasticity in lbs/in² at elongations of— | | | Tensile at break in lbs/in² | Ultimate elongation percent |
|---|---|---|---|---|---|---|
| Time minutes | Lbs. steam pressure | 300% | 500% | 700% | | |
| 30 | 30 | 143 | 275 | 771 | 2050 | 880 |
| 45 | 30 | 174 | 362 | 1110 | 2240 | 830 |
| 60 | 30 | 163 | 370 | 1180 | 2740 | 850 |

The product formed by reacting the diphenyl amine-acetone condensation product with mercaptobenzothiazole has also been employed in a rubber stock in conjunction with a basic organic nitrogen containing activating accelerator, for example diphenyl guanidine, and marked increased accelerating properties obtained thereby.

As further examples of the use of the preferred class of accelerators 6-methyl, 2-mercaptobenzothiazole and mercaptonaphthothiazole were each reacted with diacetone amine in substantially equi-molecular proportions in a manner analogous to that by which the reaction product of diacetone amine and mercaptobenzothiazole hereinbefore set forth was prepared. The reaction product of substantially equi-molecular proportions of 6-methyl, 2-mercaptobenzothiazole and diacetone amine and the reaction product of substantially equi-molecular proportions of mercaptonaphthothiazole and diacetone amine described hereinafter as Accelerators A and B respectively were each compounded separately in a gum stock comprising

| | Parts |
|---|---|
| Pale crepe rubber | 100 |
| Zinc oxide | 5 |
| Sulfur | 3 |
| Stearic acid | 1 |
| Accelerator | 1 |

After vulcanizing the above compounded rubber stock, the cured rubber product was tested and the results obtained as set forth in Table VII.

*Table VII*

| Accelerator | Cure | | Modulus of elasticity in lbs/in² at elongations of— | | | Tensile at break in lbs/in² | Ultimate elongation percent |
|---|---|---|---|---|---|---|---|
| | Time minutes | Lbs. steam pressure | 300% | 500% | 700% | | |
| A | 30 | 30 | 212 | 571 | 2355 | 3810 | 790 |
| B | 30 | 30 | 162 | 321 | 1265 | 2855 | 835 |
| A | 45 | 30 | 259 | 630 | 2420 | 3785 | 780 |
| B | 45 | 30 | 202 | 403 | 1503 | 3185 | 825 |
| A | 60 | 30 | 270 | 596 | 2390 | 3835 | 790 |
| B | 60 | 30 | 179 | 424 | 1795 | 3200 | 810 |

The data given in Table VII show that both 6-methyl, 2-mercaptobenzothiazole and mercaptonaphthothiazole, on reacting with a ketone amine, for example diacetone amine, form desirable rubber vulcanization accelerators. Their accelerating properties have been found to be greatly increased when employed in conjunction with a basic organic nitrogen containing activating accelerator, as for example diphenyl guanidine. The above accelerators, designated as Accelerators A and B respectively were separately milled in a rubber stock comprising

| | Parts |
|---|---|
| Pale crepe rubber | 100 |
| Zinc oxide | 5 |
| Sulfur | 3 |
| Stearic acid | 1 |
| Diphenyl guanidine | 0.2 |
| Accelerator A or B | 0.8 |

The compounded rubber stock was vulcanized and tested with the following results.

*Table VIII*

| Accelerator | Cure | | Modulus of elasticity in lbs/in² at elongations of— | | | Tensile at break in lbs/in² | Ultimate elongation percent |
|---|---|---|---|---|---|---|---|
| | Time minutes | Lbs. steam pressure | 300% | 500% | 700% | | |
| A | 30 | 30 | 356 | 1080 | 4155 | 4685 | 720 |
| B | 30 | 30 | 209 | 447 | 1905 | 3740 | 820 |
| A | 45 | 30 | 378 | 1108 | 4210 | 4550 | 715 |
| B | 45 | 30 | 220 | 604 | 2680 | 3980 | 770 |
| A | 60 | 30 | 376 | 1105 | 4275 | 4385 | 705 |
| B | 60 | 30 | 283 | 720 | 3110 | 4050 | 750 |

It is thus seen from the data set forth in Table VIII that both the above accelerators are activated by basic organic nitrogen containing accelerators, for example diphenyl guanidine, and form therewith very active mixed accelerators.

Other accelerators that fall within the scope of the present invention are the reaction products of triacetonamine, triacetone diamine, n-methyl triacetone amine, trimethyl diethyl-ketopiperidin and analogous ketone amines with mercaptobenzothiazole, methyl mercaptobenzothiazole, mercaptonaphthothiazole and similar mercaptans.

Furthermore other basic organic nitrogen containing accelerators may be employed in conjunction with the preferred class of accelerators. Thus, di ortho nitro tolyl guanidine, tri phenyl guanidine, 2,4 diamino diphenyl amine, 4,4' diamino diphenyl methane may be employed in conjunction therewith as activators thereof.

The present invention is limited solely by the claims attached hereto as a part of the present specification.

What is claimed is:

1. The process of treating rubber which comprises heating rubber and sulfur in the presence of an accelerator comprising a reaction product of a ketone amine and a mercapto aryl thiazole.

2. The process of treating rubber which comprises heating rubber and sulfur in the presence of an accelerator comprising a reaction product of an aliphatic ketone amine and a mercapto aryl thiazole.

3. The process of treating rubber which comprises heating rubber and sulfur in the presence of an accelerator comprising a reaction product of an aliphatic ketone amine and a mercaptobenzothiazole.

4. The process of treating rubber which comprises heating rubber and sulfur in the presence of an accelerator comprising a reaction product of an acetone amine and a mercapto aryl thiazole.

5. The process of treating rubber which comprises heating rubber and sulfur in the presence of an accelerator comprising a reaction product of an acetone amine and a mercaptobenzothiazole.

6. The process of treating rubber which comprises heating rubber and sulfur in the presence of an accelerator comprising a reaction product of diacetone amine and a mercaptobenzothiazole.

7. The process of treating rubber which comprises heating rubber and sulfur in the presence of an accelerator comprising a reaction product of substantially equi-molecular proportions of diacetone amine and mercaptobenzothiazole.

8. The process of treating rubber which comprises heating rubber and sulfur in the presence of a mixed accelerator comprising a reaction product of a ketone amine and a mercapto aryl thiazole admixed with a basic organic nitrogen containing activating accelerator.

9. The process of treating rubber which comprises heating rubber and sulfur in the presence of a mixed accelerator comprising a reaction product of an aliphatic ketone amine and a mercaptobenzothiazole admixed with a basic organic nitrogen containing activating accelerator.

10. The process of treating rubber which comprises heating rubber and sulfur in the presence of a mixed accelerator comprising a reaction product of an acetone amine and a mercapto aryl thiazole admixed with a guanidine accelerator.

11. The process of treating rubber which comprises heating rubber and sulfur in the presence of a mixed accelerator comprising a reaction product of an acetone amine and a mercaptobenzothiazole admixed with a diaryl guanidine accelerator.

12. The process of treating rubber which comprises heating rubber and sulfur in the presence of a mixed accelerator comprising a reaction product of diacetone amine and a mercaptobenzothiazole admixed with diphenyl guanidine.

13. The process of treating rubber which comprises heating rubber and sulfur in the presence of a mixed accelerator comprising a reaction product of substantially equi-molecular proportions of diacetone amine and mercaptobenzothiazole admixed with diphenyl guanidine.

14. The rubber product obtained by heating rubber and sulfur in the presence of a reaction product of a ketone amine and a mercapto aryl thiazole.

15. The rubber product obtained by heating rubber and sulfur in the presence of a reaction product of an aliphatic ketone amine and a mercapto aryl thiazole.

16. The rubber product obtained by heating rubber and sulfur in the presence of a reaction product of an aliphatic ketone amine and a mercaptobenzothiazole.

17. The rubber product obtained by heating rubber and sulfur in the presence of a reaction product of an acetone amine and a mercapto aryl thiazole.

18. The rubber product obtained by heating rubber and sulfur in the presence of a reaction product of a diacetone amine and a mercaptobenzothiazole.

19. The rubber product obtained by heating rubber and sulfur in the presence of a reaction product of substantially equi-molecular proportions of diacetone amine and mercaptobenzothiazole.

20. The rubber product obtained by heating rubber and sulfur in the presence of a mixed accelerator comprising a reaction product of a ketone amine and a mercapto aryl thiazole admixed with a basic organic nitrogen containing activating accelerator.

21. The rubber product obtained by heating rubber and sulfur in the presence of a mixed accelerator comprising a reaction product of an aliphatic ketone amine and a mercaptobenzothiazole admixed with a basic organic nitrogen containing activating accelerator.

22. The rubber product obtained by heating rubber and sulfur in the presence of a mixed accelerator comprising a reaction product of an acetone amine and a mercapto aryl thiazole admixed with a guanidine accelerator.

23. The rubber product obtained by heating rubber and sulfur in the presence of a mixed accelerator comprising a reaction product of an acetone amine and a mercaptobenzothiazole admixed with a diaryl guanidine accelerator.

24. The rubber product obtained by heating rubber and sulfur in the presence of a mixed accelerator comprising a reaction product of diacetone amine and a mercaptobenzothiazole admixed with diphenyl guanidine.

25. The rubber product obtained by heating rubber and sulfur in the presence of a mixed accelerator comprising a reaction product of substantially equi-molecular proportions of diacetone amine and mercaptobenzothiazole admixed with diphenyl guanidine.

MARION W. HARMAN.